United States Patent
Scheckelhoff

(10) Patent No.: US 10,054,911 B2
(45) Date of Patent: Aug. 21, 2018

(54) APPLIANCE CONSUMER FEEDBACK SYSTEM

(71) Applicant: General Electric Company, Schenectady, NY (US)

(72) Inventor: Ryan James Scheckelhoff, Louisville, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 285 days.

(21) Appl. No.: 14/943,127

(22) Filed: Nov. 17, 2015

(65) Prior Publication Data

US 2017/0139379 A1     May 18, 2017

(51) Int. Cl.
*G05B 13/02*     (2006.01)
*H04L 12/28*     (2006.01)

(52) U.S. Cl.
CPC .......... *G05B 13/021* (2013.01); *H04L 12/282* (2013.01); *H04L 12/2825* (2013.01); *H04L 2012/285* (2013.01)

(58) Field of Classification Search
CPC . G05B 13/021; H04L 12/2818; H04L 12/282; H04L 67/10
USPC ........................................................ 700/275
See application file for complete search history.

(56)     References Cited

U.S. PATENT DOCUMENTS

| 5,444,996 A * | 8/1995 | Joslin ..................... D06F 33/02 68/12.04 |
| 2001/0049846 A1 | 12/2001 | Guzzi et al. |
| 2003/0056300 A1* | 3/2003 | Ruhl ..................... D06F 39/085 8/158 |
| 2004/0117038 A1* | 6/2004 | Karaoguz ........... H04L 12/2803 700/11 |
| 2011/0209729 A1* | 9/2011 | Beaudet .............. A47L 15/0021 134/18 |
| 2014/0365018 A1* | 12/2014 | Kusukame ......... G05D 23/1917 700/276 |

\* cited by examiner

*Primary Examiner* — Robert E Fennema
*Assistant Examiner* — Jigneshkumar C Patel
(74) *Attorney, Agent, or Firm* — Dority & Manning, P.A.

(57)     ABSTRACT

A system and method for optimizing performance of an appliance. The method includes collecting user feedback and/or performance data related to an operating cycle of an appliance. This collected data is transmitted to a remote server which provides a recommendation, based on the user feedback and/or performance data, for improving the performance of the appliance during a subsequent operating cycle. In addition, feedback related to one appliance may be used to make operating adjustments to another appliance. In this manner, closed loop feedback can be used to improve and optimize the operation of one or more appliances.

10 Claims, 3 Drawing Sheets

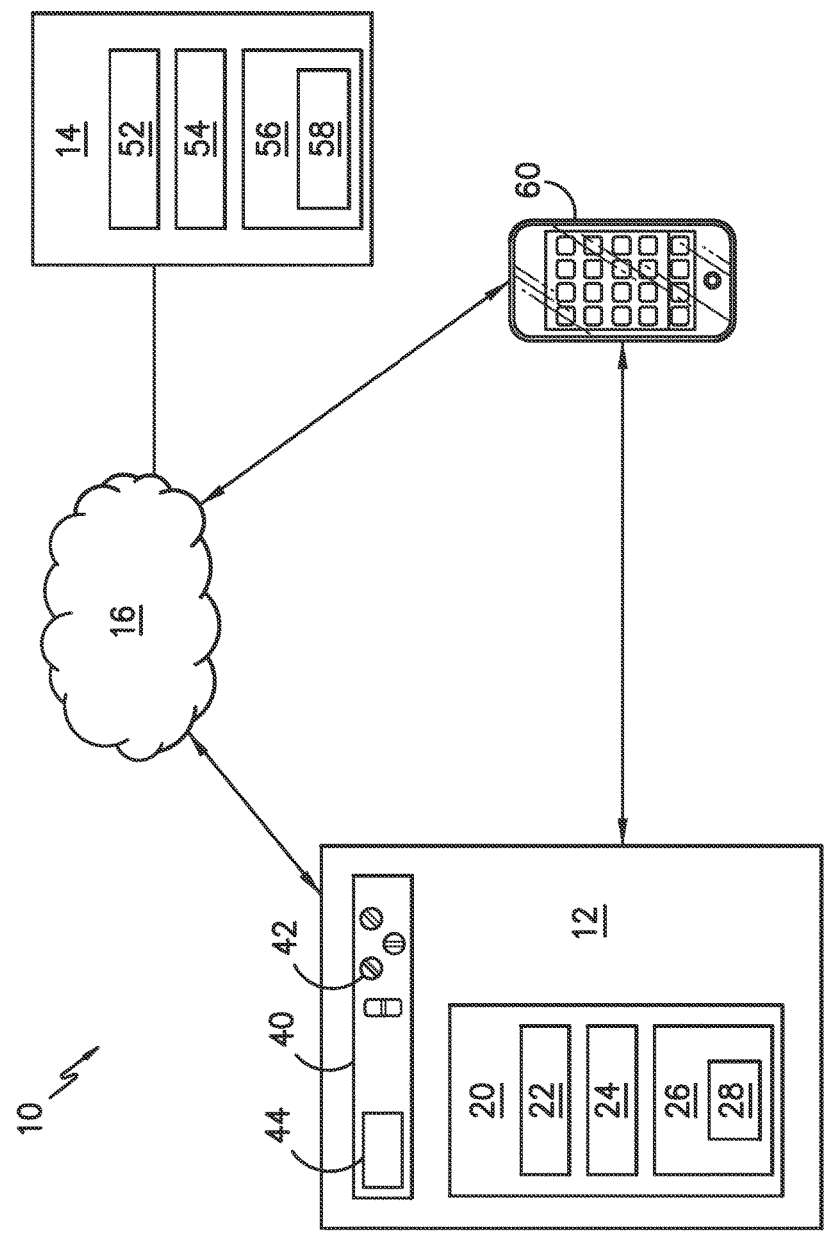
FIG. -1-

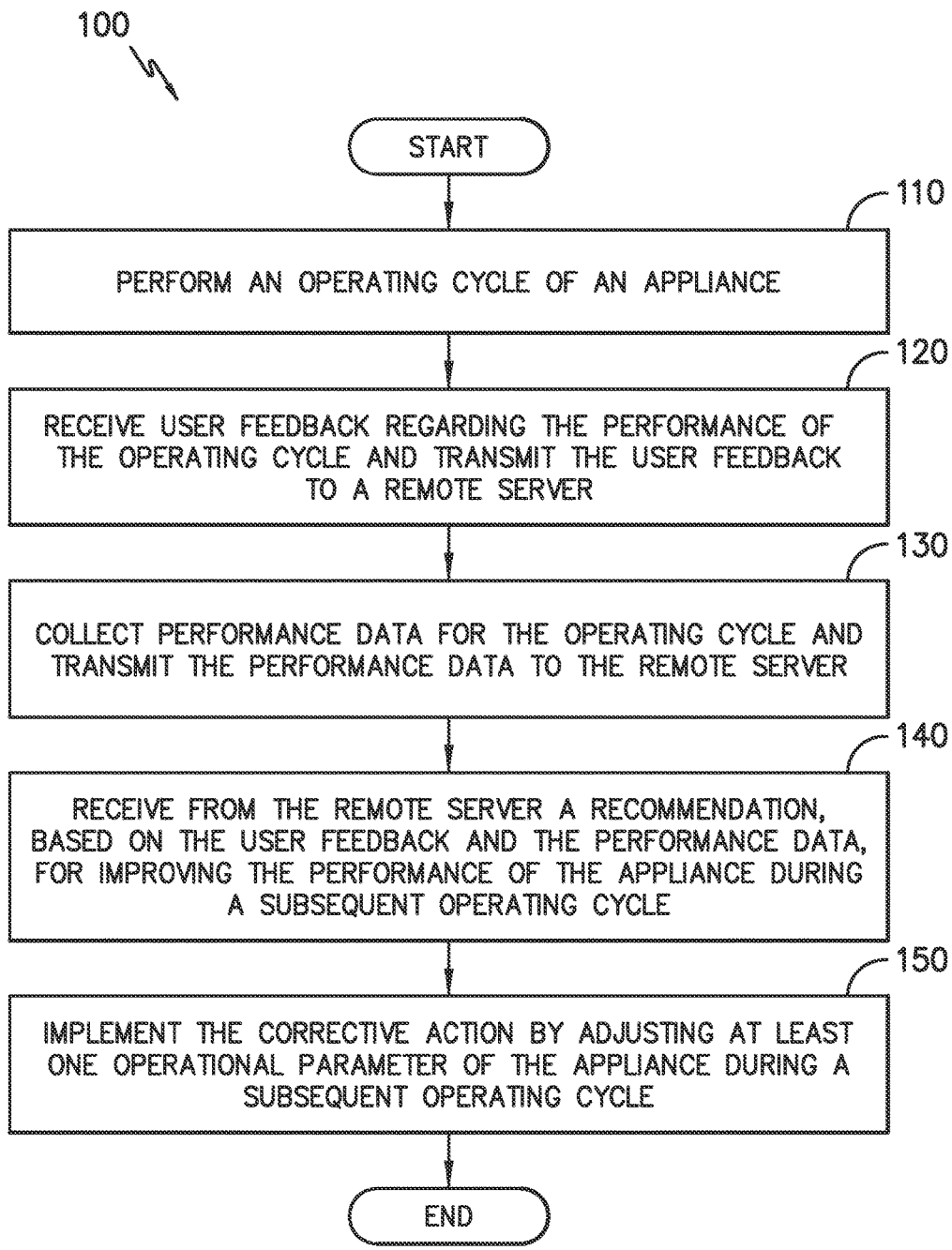
FIG. -2-

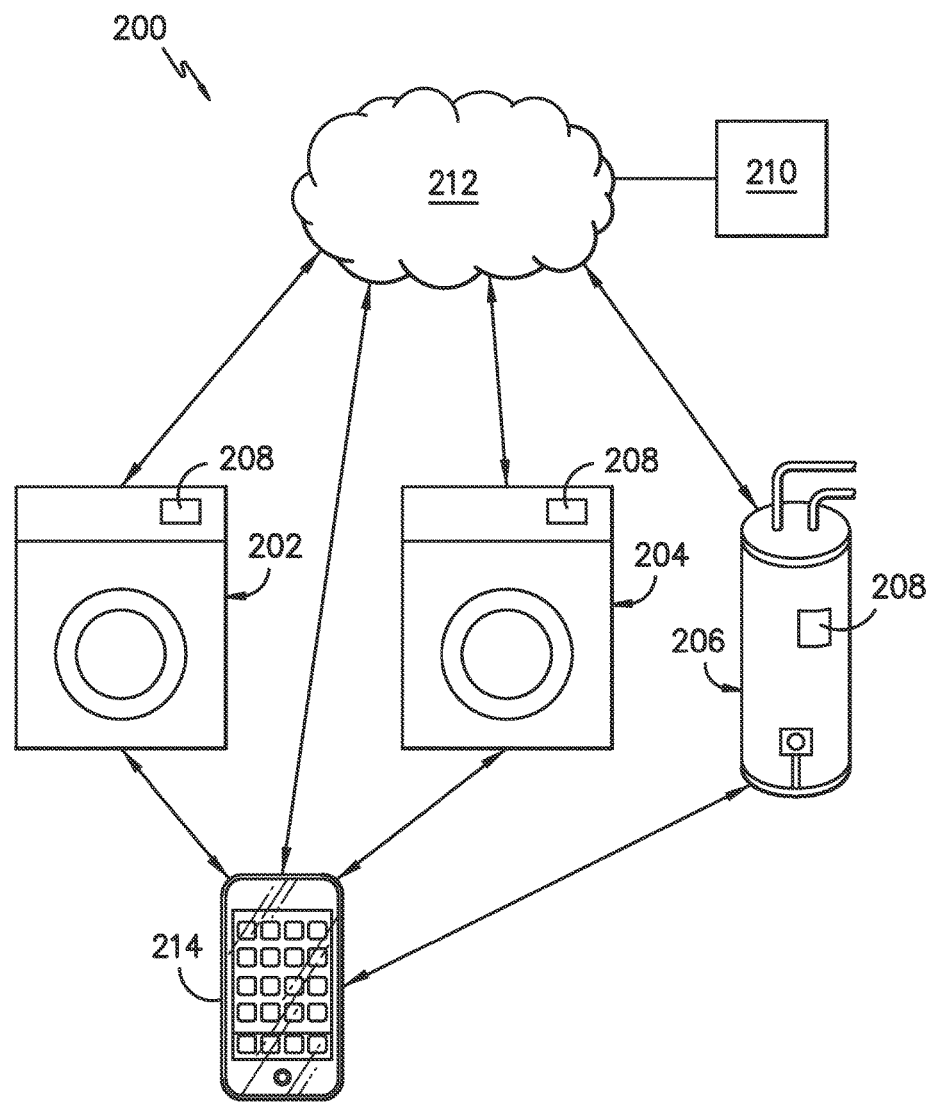
FIG. -3-

APPLIANCE CONSUMER FEEDBACK SYSTEM

FIELD OF THE INVENTION

The present disclosure relates generally to consumer appliances, or more specifically, to a system and method for providing cycle-based consumer feedback and control of one or more consumer appliances.

BACKGROUND OF THE INVENTION

Conventional consumer appliances typically operate in an open-ended manner. In this regard, all appliance settings and control inputs are set prior to beginning an operating cycle. The operating cycle is then performed based solely on the pre-cycle input, and the process is repeated during subsequent operating cycles.

However, conventional appliances fail to incorporate appliance performance during prior operating cycles as a means to improve performance during subsequent operating cycles. Operation and performance of consumer appliances may be improved by using feedback from both the appliance and the consumer regarding the performance during previous operating cycles. In failing to consider the results of prior operating cycles, conventional appliances fail to optimize appliance performance during subsequent cycles.

Accordingly, a system or method for improving appliance performance by incorporating closed loop feedback from an appliance operating cycle to make appliance adjustments for subsequent operating cycles would be useful. More particularly, a system or method incorporating performance data and consumer feedback regarding the operation of one appliance to optimize performance of that or another appliance during subsequent operating cycles would be especially beneficial.

BRIEF DESCRIPTION OF THE INVENTION

The present subject matter provides a system and method for optimizing performance of an appliance. The method includes collecting user feedback and/or performance data related to an operating cycle of an appliance. This collected data is transmitted to a remote server which provides a recommendation, based on the user feedback and/or performance data, for improving the performance of the appliance during a subsequent operating cycle. In addition, feedback related to one appliance may be used to make operating adjustments to another appliance. In this manner, closed loop feedback can be used to improve and optimize the operation of one or more appliances. Additional aspects and advantages of the invention will be set forth in part in the following description, may be apparent from the description, or may be learned through practice of the invention.

In one exemplary embodiment, a method of optimizing performance of an appliance is provided. The method includes performing an operating cycle of the appliance, receiving user feedback regarding the performance of the operating cycle, and transmitting the user feedback to a remote server. The method further includes collecting performance data for the operating cycle and transmitting the performance data to the remote server. Based on the user feedback and the performance data, a recommendation from the remote server is received for improving the performance of the appliance during a subsequent operating cycle.

In another exemplary embodiment, a system for improving the performance of one or more appliances is provided. The system includes an appliance having a controller configured for controlling an operating cycle and a communication module configured for transmitting performance data related to the operating cycle to a remote server. A user input device is configured for receiving user input regarding the performance of the operating cycle and transmitting the user input to the remote server. The appliance or the user input device are configured to receive a recommendation from the remote server for improved performance during a subsequent operating cycle, the recommendation being based at least in part on one of the performance data and the user input.

In still another exemplary embodiment, a method for improving the performance of one or more consumer appliances is provided. The method includes receiving performance data regarding an operating cycle of a consumer appliance and receiving user feedback regarding the operating cycle of the consumer appliance. The method further includes determining a corrective action based on at least one of the performance data and the user feedback and implementing the corrective action by either providing a recommendation to a user or automatically adjusting at least one operational parameter of the consumer appliance during a subsequent operating cycle.

These and other features, aspects, and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

FIG. 1 is a schematic diagram of a system for providing cycle-based consumer feedback and control of a consumer appliance according to an exemplary embodiment of the present subject matter.

FIG. 2 illustrates a method for optimizing the performance of an appliance according to an exemplary embodiment of the present disclosure.

FIG. 3 is a schematic diagram of a system for providing cycle-based consumer feedback and control of one or more consumer appliances according to an exemplary embodiment of the present subject matter.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

FIG. 1 provides a schematic diagram of a system 10 for providing cycle-based consumer feedback and control of one or more consumer appliances according to an exemplary embodiment of the present subject matter. In general, system 10 may include one or more appliances, e.g., appliance 12, that are communicatively coupled with a remote server 14 through a network 16, as described in detail below. Although a single appliance 12 is used herein as an exemplary embodiment to describe aspects of the present subject matter, one skilled in the art will appreciate that more than one appliance may be used in system 10 and that other appliances and systems may incorporate aspects of the present subject matter and remain within the scope of the invention.

According to the illustrated embodiment of FIG. 1, appliance 12 may include a controller 20. Various components of exemplary controller 20 are illustrated in schematic fashion in FIG. 1. As shown, controller 20 may include one or more processor(s) 22 and associated memory device(s) 24 configured to perform a variety of computer-implemented functions (e.g., performing the methods, steps, and the like disclosed herein). By way of example, processor 22 may include one or more microprocessors, such as general or special purpose microprocessors operable to execute programming instructions or micro-control code associated with an operating cycle. Memory 24 may represent random access memory such as DRAM, or read only memory such as ROM or FLASH. In one embodiment, processor 22 executes programming instructions stored in memory 24. Memory 24 may be a separate component from processor 22 or may be included onboard within processor 22.

Additionally, controller 20 may also include a communications module 26 to facilitate communications between controller 20 and various other components of system 10. For instance, the communications module 26 may serve as an interface to permit controller 20 to transmit and/or receive from remote server 14 performance data related to operating cycles, as discussed herein. Moreover, the communications module 26 may include an interface 28 (e.g., one or more analog-to-digital converters) to permit input signals to be converted into signals that can be understood and processed by the processor 22.

Controller 20 may be positioned in a variety of locations throughout appliance 12. In the exemplary embodiment illustrated in FIG. 1, controller 20 may be located proximate a user interface panel 40 of appliance 12. In such an embodiment, input/output ("I/O") signals may be routed between the controller 20 and various operational components of appliance 12 along wiring harnesses that may be routed through a cabinet of appliance 12. Typically, controller 20 is in communication with user interface panel 40, which may represent a general purpose I/O ("GPIO") device or functional block. According to an exemplary embodiment, user interface 40 may include controls 42 through which a user may select various operational features and modes of appliance 12. In one embodiment, controls 42 may include one or more of a variety of electrical, mechanical, or electro-mechanical input devices including rotary dials, push buttons, and touch pads. User interface 40 may also include a display component, such as a digital or analog display device 44 designed to provide operational feedback to a user and allow for monitoring the progress of an operating cycle.

User interface 40 may be in communication with controller 20 via one or more signal lines or shared communication busses. Controller 20 may also be communication with one or more sensors to monitor the operation of appliance 12. For example, according to an exemplary embodiment, appliance 12 may be a washing machine, and sensors may include temperature sensors to measure water temperature, water level gauges, vibration sensors to measure out-of-balance conditions, and other sensors for measuring and monitoring an operating cycle of appliance 12. In this manner, controller 20 may operate appliance 12 in response to user manipulation of user interface panel 40 and can also receive performance feedback from sensors placed throughout appliance 12. In addition, performance data or cycle status indicators may be indicated to the user with display 44.

As mentioned above, system 10 may further include remote server 14. Remote server 14 may generally operate to store, receive, and transmit signals associated with operating cycles, such as performance data, and may thus be in communication with appliance 12 through controller 20. For example, remote server 14 may include one or more processor(s) 52 and associated memory device(s) 54 configured to perform a variety of computer-implemented functions (e.g., performing the methods, steps, and the like disclosed herein). By way of example, processor 52 may include one or more microprocessors, such as general or special purpose microprocessors operable to execute programming instructions or micro-control code associated with an operating cycle. Memory 54 may represent random access memory such as DRAM, or read only memory such as ROM or FLASH. In one embodiment, processor 52 executes programming instructions stored in memory 54. Memory 54 may be a separate component from processor 52 or may be included onboard within processor 52.

Additionally, the remote server 14 may also include a communications module 56 to facilitate communications between the remote server 14 and controller 20 and various other components of the system 10, such as a user input device 60, as discussed below. For instance, the communications module 56 may serve as an interface to permit the remote server 14 to transmit and/or receive performance data associated with operating cycles and recommendations for improving operating cycles. Moreover, the communications module 56 may include an interface 58 (e.g., one or more analog-to-digital converters) to permit input signals to be converted into signals that can be understood and processed by the processor 52.

Server 14 is remote, and thus external to appliance 12 which is typically located at a single location, e.g., a consumer's residence. The server 14 may, for example, be in another room of a house or building in which the system 10 is utilized, or in a neighboring building, etc. Alternatively, and in exemplary embodiments, the remote server 14 is a cloud-based server 14, and is thus located at a distant location, such as in a separate state, country, etc. The remote server 14 may be in wireless communication with the appliance 12 (and controller 20), such as through a network 16. The network 16 may be any type of wireless communications network, such as a local area network (e.g. intranet), wide area network (e.g. Internet), or some combination thereof. The network 16 can also include a direct connection between the client devices, such as appliance 12, as discussed herein, and the remote server 14. In general, communication between the remote server 14 and the client devices may be carried via a network interface using any type of wireless connection, using a variety of communication protocols (e.g. TCP/IP, HTTP, SMTP, FTP), encodings or formats (e.g. HTML, XML), and/or protection schemes (e.g. VPN, secure HTTP, SSL). Accordingly, operating cycle and status information may be transmitted from controller 20 to the remote server 14 using the network 16.

System 10 may further include user input device 60 that may be configured for receiving user input regarding the performance of the operating cycle and transmitting the user input to remote server 14. According to an exemplary embodiment, user input device 60 may be a mobile phone or tablet that is in wireless communication with network 16 and remote server 14. Alternatively, user input device 60 may be a personal computer, may be a dedicated input terminal on appliance 12, may be a module within user interface 40 of appliance 12, or may be any other device suitable for receiving feedback from a user and transmitting that feedback to remote server 14. In addition, user input device 60 may be used to communicate directly with appliance 12, for example, to adjust appliance settings or receive performance data.

As shown in FIG. 1, user input device 60 may be a mobile phone having a software application for inputting feedback and transmitting the feedback to remote server 14. The feedback may be solicited by the application in certain circumstances, such as by pop-up indicators or requests, seeking that the user provides feedback to specific cycles or perform some action to rectify a fault condition with appliance 12. Alternatively, the user feedback may be initiated by the user by launching the application when it is desirable to provide feedback, such as when an issue has occurred or system performance is not satisfactory to the user.

As will be understood by those skilled in the art, appliance 12 illustrated in FIG. 1 is provided only for the purpose of explanation and is not intended to limit the scope of the present subject matter. Aspects of the present subject matter may be used with any suitable number and type of appliances and it should be appreciated that the invention is not limited to any particular style, model, or configuration of these appliances. Indeed, the present subject matter may be used with other consumer or commercial appliances, such as, cooking appliances, dishwashers, microwave ovens, refrigerators, etc. In addition, one skilled in the art will appreciate that the schematic diagram shown in FIG. 1 is a simplified representation of the appliances and communication links that may be used to perform certain aspects of the present subject matter. Other components may be used, other configurations are possible, and these variations may be within the scope of the present subject matter.

Now that the details of system 10 according to an exemplary embodiment of the present subject matter have been presented, an exemplary method 100 of optimizing performance of an appliance by suggesting or implementing a corrective action based on collected user feedback and performance data will be described. Although the discussion below refers to the exemplary method 100 of operating appliance 12, one skilled in the art will appreciate that the exemplary method 100 is applicable to the operation of a variety of other appliances and systems, and system 10 is used only for the purpose of explanation. For example, it should be understood that method 100 may be used, for example, for systems incorporating more than one appliance, including cooking appliances, dishwashers, or other suitable consumer or commercial appliances.

Referring now specifically to FIG. 2, an exemplary method 100 for improving or optimizing the performance of one or more consumer appliances will be described. In general, FIG. 2 illustrates method 100 for operating a system of appliances and a remote server, such as system 10, according to exemplary embodiments of the present subject matter. In particular, method 100 enables closed loop feedback regarding the performance of appliance 12 and provides or implements a recommendation for improving future performance of appliance 12. To perform method 100 using system 10, controller 20 may be programmed to perform method 100, e.g., by collecting performance data and/or user feedback, transmitting the data to a remote server, receiving a recommendation for corrective action, and implementing the corrective action during a subsequent operating cycle. However, one skilled in the art will appreciate that method 100 may be performed using other systems as well.

Method 100 includes, at step 110, performing an operating cycle of appliance 12. An operating cycle may be generally defined as any task or operation performed by an appliance in accordance with the purposes for which the appliance is typically used. Operating cycles may be initiated by an input from the consumer or remote server 14, by a timer, or by any other suitable means. Once initiated, operating cycles typically continue to completion, or until a certain trigger condition or event occurs. For example, an operating cycle of a washing machine may be a pre-soak cycle, a wash cycle, rinse cycle, spin cycle, or any combination of these cycles. An operating cycle of a dryer may be the regular drying cycle, a timed drying cycle, or a "fluff" or refresh cycle. An operating cycle of a hot water heater may be to heat water or maintain the temperature of water. One skilled in the art will appreciate that these operating cycles are only exemplary, and other operating cycles are possible and within the scope of the invention.

At step 120, method 100 may further include collecting and transmitting user feedback regarding the performance of the operating cycle of appliance 12 to remote server 14. This feedback may be input using user input device 60, through user interface 40 of appliance 12, or using any other suitable method of soliciting, collecting, and transmitting feedback from a consumer. As discussed above, a common user input device 60 may be a mobile phone or personal computer that has an application installed through which a consumer may access the appliance 12 user interface 40 and/or the remote server 14. Alternatively, user input device 60 may be located on appliance 12 itself, such as within user interface 40. Other means for providing user feedback are also possible and within the scope of the present subject matter.

For example, if the consumer wishes to provide feedback after an operating cycle or cycles, they may use user input device 60 to, e.g., open an application that has the option to provide feedback on a previous operating cycle. The application may provide a list of previously run cycles with dates, times, and/or settings hints that can assist the user in choosing the correct operating cycle for which they wish to provide feedback. After the desired operating cycle has been selected, the user may be prompted to enter feedback on the performance of their operating cycle. This feedback may be in the form of survey data, performance ratings, identified issues, or may even include photos related appliance performance, e.g, photos of their clothes, dishes, etc.

In addition to collecting and transmitting user feedback, performance data may be collected and transmitted to remote server 14 at step 130. For example, appliance 12 may be configured to collect and transmit performance data to remote server 14. More particularly, before, during, and after performance of an operating cycle, performance data and user settings may be collected by and transmitted to remote server 14 by controller 20.

As used herein, performance data may generally refer to any data, parameter, or condition that is related to or affects the results of an operating cycle of an appliance. Performance data may be measured by the appliance, entered by the consumer, or determined in any other suitable manner. For example, according to an example embodiment, appliance 12 may be a washing machine, and performance data may include appliance-controlled parameters, such as water temperature, water levels, detergent levels, cycle time, spin speed, detergent levels, soil levels, fault indications, error conditions, warnings, and other operating information related to an operating cycle of appliance 12. In addition, performance data may also include consumer-controlled parameters, such as initial soil levels, pretreating procedures, and the quantity, type, and distribution of clothing within the wash chamber.

Performance data may be logged, recorded, or otherwise stored by remote server 14 along with a unique cycle identifier, timestamp, or other identifying indicia which a consumer could use to select the appropriate cycle to associate with user feedback. More specifically, when the feedback is transmitted and logged with remote server 14, the survey data, consumer responses, attached photos, user settings, and appliance performance data may be compiled and assembled to allow for detailed analysis.

At step 140, method 100 may include receiving from remote server 14 a recommendation, based on the user feedback and the performance data, for improving the performance of appliance 12 during a subsequent operating cycle. For example, in system 10, controller 20 may be configured to receive such a recommendation. Therefore, after remote server 14 receives and collects the transmitted performance data and user feedback, processor 52 may be used to analyze that data and determine an appropriate response or corrective action to improve the performance of appliance 12 during a subsequent operating cycle. Processor 52 may implement algorithms developed to identify common issues experienced by appliances and formulate the most appropriate responses. According to an exemplary embodiment, such an algorithm may be in the form of a fault tree analysis, where performance conditions and user feedback can quickly determine one or more potential solutions to issues that arise. In this regard, remote server 14 may have memory 54 which stores common faults for particular appliances as well as common remedies for those problems. In this manner, remote server 14 may recommend a corrective action based on at least one of the performance data and the user feedback.

At step 150, method 100 may further include implementing the recommended corrective action, e.g., by adjusting at least one operational parameter of appliance 12 for a subsequent operating cycle. An operational parameter may include a setting, cycle, or configuration of appliance 12. In this regard, the recommendation may be a command to appliance 12 to implement corrective action by automatically adjusting at least one operational parameter of appliance 12 during a subsequent operating cycle. By contrast, the recommendation may also be in the form of an instruction to the consumer for improving appliance 12 performance during the subsequent cycle by making an adjustment that enables appliance 12 to operate more effectively. For example, if appliance 12 is a dishwasher or washing machine, the recommendation may be an instruction to pretreat the dishes or clothes, respectively, or to place them in appliance 12 in a certain manner.

Continuing the example in which appliance 12 is a washing machine, some exemplary suggested settings or tips for improved performance may include: (1) tips on proper distribution of loads suffering from out of balance conditions; (2) suggestions for optional temperature/cycle settings for given stains; (3) suggestions to run a completely different operating cycle; (4) indications if fabric softener or detergent was low during the operating cycle; and (5) suggestions for extra rinse options if user indicated they were unhappy with rinse performance.

The suggestions or tips, of course, may vary depending on the appliance for which user feedback and performance data is obtained. For example, if appliance 12 is a dishwasher, recommendations may include tips on loading dishes or selecting cycle options to improve cleanliness, or an indication that rinse aid was low during a particular dishwasher cycle. One skilled in the art will appreciate that other manners of using performance data from one appliance to improve the performance of another appliance are possible and within the scope of the present subject matter.

Although the above-described embodiment describes performance data and user feedback as being using to provide a recommendation to a user or appliance 12 to adjust a setting, cycle, or operational parameter of appliance 12, this feedback may be used for other purposes as well. For example, if a user needs to have a repair or make a service call related to appliance 12, repairmen and service call takers may help respond with suggestions based on the performance data and user feedback. In addition, data related to a particular appliance, or data from multiple consumers having the same appliance, may be compiled and be fed back into development teams to help address current issues related to a particular appliance and implement solutions to existing appliances or incorporate design improvements into future appliances. In this manner, system 10 and method 100 may provide a holistic approach to improving performance of one or more of appliances.

The system 10 and method 100 described above enables the optimization of appliance performance based on performance data and user feedback. The system thus enables the appliance manufacturer to close the loop directly and conveniently with consumers regarding the performance of their appliances. Appliance improvements may be based on meaningful performance data that is linked directly to user feedback. User experience may be improved by enabling service teams to provide more meaningful assistance and useful suggestions to achieve immediate improvement of appliance performance. In addition, engineering teams may identify aspects of their appliances which need improvement and dispatch fixes to those problems or corrections in future appliances, resulting in improved product management and customer satisfaction. Other advantages to such a system will be evident to those skilled in the art.

Although system 10 is described above as having a single appliance 12 in communication with remote server 14 and user input device 60, one skilled in the art will appreciate that different configurations of appliance 12 may be used and additional appliances may be included in systems similar to system 10 while remaining within the scope of the present subject matter. For example, as shown in FIG. 3, exemplary system 200 may include three consumer appliances: a washing machine 202, a dryer 204, and a hot water heater 206. Each of these appliances may have a controller 208 that may operate in a similar manner as controller 20. More specifically, controller 208 may communicate with a remote server 210 through a network 212. A user input device 214 may be used in a manner similar to user input device 60 to provide user feedback to remote server 210 as well as receive performance data and recommendations from remote server 210.

Notably, the overall performance of washing machine 202, dryer 204, and hot water heater 206 are often interrelated. In other words, adjusting an operational parameter of one appliance might affect the performance of another.

Therefore, remote server 210 may operate in the same manner as described above, except that the analysis and recommendations for improved appliance performance may be directed to any appliance in system 200 and may be based on cumulative data and feedback collected for each of those appliances. For example, if soiled articles of clothing did not come clean, the temperature setting of hot water heater 206 may be increased to ensure sufficiently hot water is received by washing machine 202. If clothes are not coming out of dryer 204 completely dry, or if the dryer cycle is taking longer than it otherwise should, the spin cycle speed of washing machine 202 may be adjusted to remove more water prior to the drying cycle. In addition, out of balance loads within washing machine 202 often result in improper spin-out of clothing, so an appropriate instruction or suggestion related to user loading and balancing of clothing may remedy this issue. One skilled in the art will appreciate that the above-described appliances and recommendations for improved performance are only exemplary and not intended to limit the scope of the present subject matter.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims or if they include equivalent structural elements with insubstantial differences from the literal language of the claims.

What is claimed is:

1. A method of optimizing performance of a dishwasher, the method comprising:
    performing an operating cycle of the dishwasher;
    receiving user feedback regarding the performance of the operating cycle and transmitting the user feedback to a remote server;
    collecting performance data for the operating cycle and transmitting the performance data to the remote server;
    receiving from the remote server a recommendation, based on the user feedback and the performance data, for improving the performance of the dishwasher during a subsequent operating cycle; and
    performing the subsequent operating cycle using an adjusted operational parameter based on the recommendation received from the remote server, wherein the recommendation comprises an instruction to the user for adjusting the positioning of the dishes of the dishwasher before initiating the subsequent operating cycle.

2. The method of claim 1, wherein the recommendation comprises a command to adjust at least one operational parameter of the dishwasher for the subsequent operating cycle.

3. The method of claim 1, wherein the instruction comprises a suggested dishwasher setting or a tip that may result in improved dishwasher performance during the subsequent operating cycle.

4. A system for improving the performance of one or more appliances, the system comprising:
    a clothes dryer having a controller configured for controlling a drying cycle and a communication module configured for transmitting performance data related to the drying cycle to a remote server;
    a user input device configured for receiving user input regarding the performance of the drying cycle and transmitting the user input to the remote server; and
    a clothes washer configured for performing a subsequent wash cycle,
    wherein the clothes washer or the user input device are configured to receive a recommendation from the remote server for improved performance during the subsequent wash cycle, the recommendation being based at least in part on one of the performance data and the user input, wherein the recommendation comprises adjusting a spin-dry speed during the subsequent wash cycle or an instruction to the user of the clothes washer to properly distribute clothing within a tub of the clothes washer before initiating the subsequent wash cycle, and wherein the clothes washer performs the subsequent operating cycle.

5. The system of claim 4, wherein the recommendation comprises a command to adjust at least one operational parameter of the clothes dryer for a subsequent operating cycle.

6. The system of claim 4, wherein the performance data relates to at least one of water levels, spin speed, detergent levels, or fault indications, and the user feedback relates to one of soil conditions, wash performance, cycle time, or cycle noise.

7. A method for improving the performance of one or more consumer appliances, the method comprising:
    receiving performance data regarding an operating cycle of a first consumer appliance;
    receiving user feedback regarding the operating cycle of the first consumer appliance;
    determining a corrective action based on at least one of the performance data and the user feedback;
    implementing the corrective action by either providing a recommendation to a user or automatically adjusting at least one operational parameter of a second appliance during a subsequent operating cycle, wherein the recommendation comprises adjusting an operational parameter for the second appliance; and
    performing the subsequent operating cycle using the at least on adjusted operational parameter based on the recommendation,
    wherein the first appliance is a clothes dryer and the second appliance is a clothes washer.

8. The method of claim 7, wherein the recommendation comprises an instruction to the user of the second appliance to implement at least one preliminary corrective action before initiating the subsequent operating cycle.

9. The method of claim 7, wherein the recommendation for improving performance is adjusting a spin-dry speed or an instruction to properly distribute clothing within a tub of the clothes washer.

10. The method of claim 7, wherein the performance data relates to at least one of water levels, spin speed, detergent levels, or fault indications, and the user feedback relates to one of soil conditions, wash performance, cycle time, or cycle noise.

* * * * *